United States Patent
Idan et al.

(10) Patent No.: US 10,518,509 B2
(45) Date of Patent: *Dec. 31, 2019

(54) FLEXIBLE PACKAGING MATERIAL

(71) Applicant: HP Indigo B.V., Amstelveen (NL)

(72) Inventors: David Idan, Nes Ziona (IL); Albert Teishev, Rishon le-zion (IL); Amnon Levi, Gedera (IL); Raia Slivniak, Lod (IL); Asaf Salant, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 205 days.

This patent is subject to a terminal disclaimer.

(21) Appl. No.: 15/526,323

(22) PCT Filed: Nov. 12, 2014

(86) PCT No.: PCT/EP2014/074405
§ 371 (c)(1),
(2) Date: May 11, 2017

(87) PCT Pub. No.: WO2016/074716
PCT Pub. Date: May 19, 2016

(65) Prior Publication Data
US 2017/0326774 A1    Nov. 16, 2017

(51) Int. Cl.
*B32B 27/30* (2006.01)
*B29C 48/00* (2019.01)
(Continued)

(52) U.S. Cl.
CPC .......... *B32B 27/30* (2013.01); *B29C 48/0021* (2019.02); *B29C 48/0023* (2019.02); *B29C 48/21* (2019.02); *B32B 1/02* (2013.01); *B32B 1/08* (2013.01); *B32B 15/08* (2013.01); *B32B 27/08* (2013.01); *B32B 27/10* (2013.01); *B32B 27/302* (2013.01); *B32B 27/306* (2013.01);
(Continued)

(58) Field of Classification Search
CPC .. B32B 1/02; B32B 1/08; B32B 27/30; B32B 27/302; B32B 27/306; B32B 27/308; B32B 27/32; B32B 27/327; B32B 27/34; B32B 27/36; B32B 27/40; B29C 48/0021; B29C 48/0023
See application file for complete search history.

(56) References Cited

U.S. PATENT DOCUMENTS 5,561,014 A   10/1996   Kato
6,262,174 B1   7/2001   Cooper et al.
(Continued)

FOREIGN PATENT DOCUMENTS

CN   102203196   9/2011
EP   1818171   8/2007
(Continued)

OTHER PUBLICATIONS

Andrew Lee, "Lamination", Edan Pring Services, Aug. 5, 2009, 1 page, http://www.edanprintservices.co.uk/lamination.htm.
International Search Report and Written Opinion for International Application No. PCT/EP2014/074405 dated Jul. 1, 2015, 12 pages.

*Primary Examiner* — Walter Aughenbaugh
(74) *Attorney, Agent, or Firm* — Dierker & Kavanaugh PC

(57) ABSTRACT

Flexible packaging materials with electrophotographically printed images or information, and processes for preparing such flexible packaging materials are disclosed.

17 Claims, 1 Drawing Sheet

(51) Int. Cl.
 *B29C 48/21*  (2019.01)
 *B32B 15/08*  (2006.01)
 *B32B 27/08*  (2006.01)
 *B32B 27/10*  (2006.01)
 *B32B 27/32*  (2006.01)
 *B32B 27/36*  (2006.01)
 *B32B 37/15*  (2006.01)
 *B32B 38/00*  (2006.01)
 *B32B 27/34*  (2006.01)
 *B32B 1/02*  (2006.01)
 *B32B 1/08*  (2006.01)
 *B32B 27/40*  (2006.01)

(52) U.S. Cl.
 CPC ............ *B32B 27/308* (2013.01); *B32B 27/32* (2013.01); *B32B 27/327* (2013.01); *B32B 27/34* (2013.01); *B32B 27/36* (2013.01); *B32B 27/40* (2013.01); *B32B 37/153* (2013.01); *B32B 38/145* (2013.01); *B32B 2255/205* (2013.01); *B32B 2255/26* (2013.01); *B32B 2307/4023* (2013.01); *B32B 2439/70* (2013.01)

(56) References Cited

U.S. PATENT DOCUMENTS

| | | | |
|---|---|---|---|
| 6,355,355 | B1 | 3/2002 | Inoue et al. |
| 6,824,868 | B2 | 11/2004 | Bell et al. |
| 7,086,666 | B2 | 8/2006 | Richardson |
| 7,261,795 | B2 | 8/2007 | Wilkinson et al. |
| 7,281,360 | B1 | 10/2007 | Larimore et al. |
| 7,416,823 | B2 | 8/2008 | Yanagawa et al. |
| 7,854,987 | B2 | 12/2010 | Jaipuria |
| 8,247,063 | B2 | 8/2012 | Holbert et al. |
| 8,356,459 | B1 | 1/2013 | Larimore et al. |
| 10,213,950 | B2 * | 2/2019 | Salant .................. B32B 7/12 |
| 2011/0104441 | A1 | 5/2011 | Bhattacharyya |
| 2013/0052572 | A1 | 2/2013 | Nukada et al. |

FOREIGN PATENT DOCUMENTS

| | | |
|---|---|---|
| WO | WO-0140395 | 6/2001 |
| WO | WO-2005021251 | 3/2005 |
| WO | WO2010128175 | 11/2010 |
| WO | WO-2012006156 | 1/2012 |
| WO | WO-2014044322 | 3/2014 |

* cited by examiner

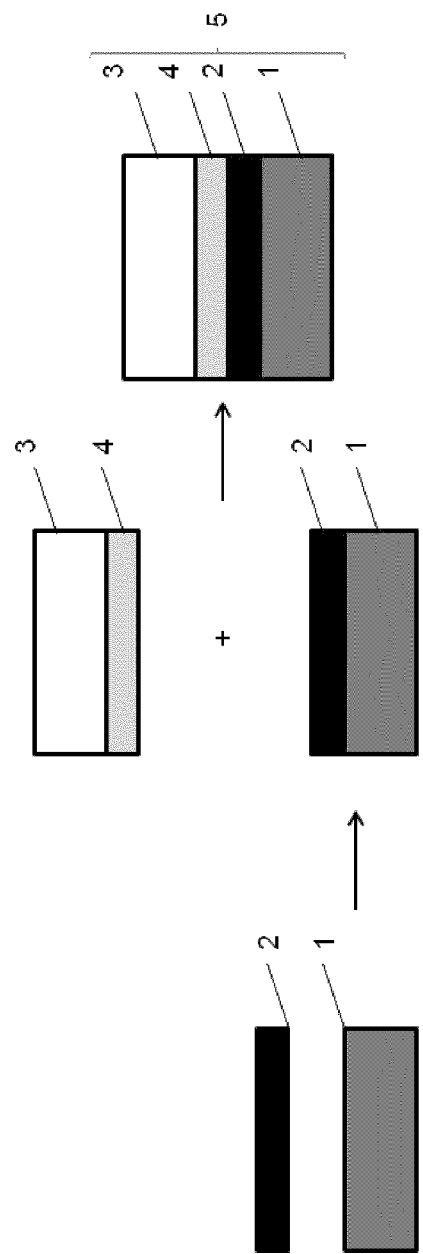

FLEXIBLE PACKAGING MATERIAL

BACKGROUND

All manner of consumer goods, in particular food products, are packaged using thin films or sheets of flexible packaging material, with images such as corporate branding, or product information printed onto the film. The flexible packaging material serves to protect the product from, for example, moisture, oxidation or pathogens, while also providing information to the user regarding the nature and origin of the product contained therein.

Liquid electrophotographic printing, or electrostatic printing, is one method by which images or information can be printed onto substrates such as paper or plastic. The printing processes typically involve creating an image on a photoconductive surface, applying an ink having charged particles to the photoconductive surface, such that they selectively bind to the image, and then transferring the charged particles in the form of the image to a print substrate.

BRIEF DESCRIPTION OF THE FIGURE

FIG. 1 shows a schematic of a process for producing a flexible packaging material in accordance with the present disclosure.

DETAILED DESCRIPTION

Before the present disclosure is disclosed and described, it is to be understood that this disclosure is not limited to the particular process steps and materials disclosed herein because such process steps and materials may vary somewhat. It is also to be understood that the terminology used herein is used for the purpose of describing particular embodiments. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "carrier fluid", "carrier liquid," "carrier," or "carrier vehicle" refers to the fluid in which pigment particles, colorant, charge directors and other additives can be dispersed to form a liquid electrostatic composition or electrophotographic composition. The carrier liquids may include a mixture of a variety of different agents, such as surfactants, co-solvents, viscosity modifiers, and/or other possible ingredients.

As used herein, "electrostatic ink composition" or "liquid electrophotographic composition" generally refers to an ink composition that is typically suitable for use in an electrostatic printing process, sometimes termed an electrophotographic printing process. It may comprise pigment particles, which may comprise a thermoplastic resin.

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "co-polymer" refers to a polymer that is polymerized from at least two monomers.

As used herein, "lamination bond strength" refers to the force (per length) required to delaminate a laminated material, and is expressed in units of Newton/inch, or N/in. The lamination bond strength can be measured according to standard techniques, in particular ASTM F0904-98R08. Unless otherwise stated, the lamination bond strength of a flexible packaging material described herein refers the strength to delaminate the material at the interface between a thermally activatable laminating material and either of the two materials to which the thermally activatable laminating material has bonded.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer, as known in the art. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly or indirectly via an intermediate transfer member to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid composition is employed in the electrophotographic process rather than a powder toner. An electrostatic printing process may involve subjecting the electrostatic composition to an electric field, e.g. an electric field having a field gradient of 50-400 V/µm, or more, in some examples 600-900 V/µm, or more.

As used herein, "NVS" is an abbreviation of the term "non-volatile solids".

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

In an aspect there is provided a flexible packaging material, comprising:
  a flexible substrate comprising a first surface;
  an electrophotographic ink composition printed on the first surface of the flexible substrate, the printed electrophotographic ink composition comprising a polymer resin comprising a copolymer of an alkylene monomer and a monomer selected from acrylic acid and methacrylic acid;
  a polymeric base layer; and
  a thermally activatable laminating layer co-extruded with the polymeric base layer and thermally laminated to the first surface of the flexible substrate printed with the electrophotographic ink composition.

In another aspect there is provided process for preparing a flexible packaging material, comprising:
  printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
  co-extruding a polymeric base material with a thermally activatable laminating material to form a thermally activatable laminating layer disposed on a polymeric base layer; and
  contacting under conditions of heat and/or pressure the thermally activatable laminating layer with the first surface of the flexible substrate comprising the printed electrophotographic ink composition.

In another aspect there is provided a process for preparing a flexible packaging material, comprising:
  providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
  providing a second flexible material comprising a polymeric base layer co-extruded with a thermally activatable laminating layer; and
  contacting under conditions of heat and/or pressure the thermally activatable laminating layer with the first surface of the substrate comprising the printed electrophotographic ink composition.

In another aspect there is provided a flexible packaging material made by a process comprising:
  printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
  co-extruding a polymeric base material with a thermally activatable laminating material to form a thermally activatable laminating layer disposed on a polymeric base layer; and
  contacting under conditions of heat and/or pressure the thermally activatable laminating layer with the first surface of the flexible substrate comprising the printed electrophotographic ink composition.

In another aspect there is provided a flexible packaging material made by a process comprising:
  providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
  providing a second flexible material comprising a polymeric base layer co-extruded with a thermally activatable laminating layer; and
  contacting under conditions of heat and/or pressure the thermally activatable laminating layer with the first surface of the substrate comprising the printed electrophotographic ink composition.

Much research has been carried out in recent years to try to develop laminated flexible packaging materials comprising a functional (barrier) substrate laminated to a second substrate comprising a printed image or information. Many solvent based or even "solvent free" laminating adhesives require a prolonged period of curing, and so there is a lag time between a flexible packaging material being produced and the material being ready for packaging food. Thus, when used with digital printing processes, conventional laminating technologies negate the advantage of short turnaround on the printing process due to long post-printing processes/wait times.

The present inventors have found that examples of the method as described herein avoid or at least mitigate at least one of the difficulties described above. They have found that examples of the method are more successful than previous methods in that the lamination and bonding is immediate such that no cure time is required. The methods described can be implemented in-line with a conventional electrostatic printing process, thus further streamlining the process for producing flexible packaging materials.

Flexible Packaging Material

In one example, a flexible packaging material is described. The flexible packaging material may be produced by any of the methods described herein. Each component of the flexible packaging material will be discussed in the sections which follow.

In one example, the flexible packaging material comprises a laminate structure with sufficient bond strength to avoid delamination of the layers, in particular delamination at the interface between the layer of laminating material (which may be thermally activatable) and the surface of the print substrate comprising the electrophotographically printed image or information. In one example, the lamination bond strength is measured directly after the flexible packaging material has cooled to room temperature following lamination. In one example, the lamination bond strength is measured on a flexible packaging material that has not been subjected to any curing or rest period following lamination and cooling. In one example, the lamination bond strength is measured immediately after lamination and cooling of the flexible packaging material.

In one example, the flexible packaging material has a lamination bond strength as measured by ASTM F0904-98R08. In one example, the flexible packaging material has a lamination bond strength of at least about 0.5 N/inch, for example at least about 1.0 N/inch, for example at least about 1.2 N/inch, for example at least about 1.5 N/inch, for example at least about 2.0 N/inch, for example at least about 2.5 N/inch, for example at least about 3.0 N/inch, for example at least about 4.0 N/inch, for example at least about 5.0 N/inch, for example at least about 6.0 N/inch, for example at least about 7.0 N/inch, for example at least about 8.0 N/inch, for example at least about 9.0 N/inch, for example about 10.0 N/inch, as measured by ASTM F0904-98R08.

In one example, the flexible packaging material has a lamination bond strength of less than about 10 N/inch, for example less than about 9.0 N/inch, for example less than about 8 N/inch, for example less than about 7.0 N/inch, for example less than about 6.0 N/inch, for example less than about 5.0 N/inch, for example less than about 4.0 N/inch, for example less than about 3.0 N/inch, for example less than about 2.5 N/inch, for example less than about 2.0 N/inch, for example less than about 1.5 N/inch, for example less than about 1.2 N/inch, for example less than about 1.0 N/inch, for example about 0.5 N/inch, as measured by ASTM F0904-98R08.

Flexible (Print) Substrate

The flexible substrate, to which the liquid electrophotographic ink composition is to be printed (and thus is also referred to herein as the print substrate) may be any material suitable for use in a liquid electrophotographic printing process and suitable for use in a flexible packaging material. Since the flexible substrate forms the outermost layer of the final, laminated flexible packaging material as prepared in the methods described herein, in one example the flexible substrate is transparent in order that the printed image or information is visible to the consumer.

In one example, the flexible substrate comprises a film of a polymer, for example a thermoplastic polymer. In one example, the flexible substrate comprises a film of biaxially oriented polypropylene (BOPP), or polyethylene terephthalate (PET). Other suitable polymers will be known in the art and the examples provided above should be seen as non-limiting examples only.

In one example, the flexible substrate comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In one example, the film of polymer is about 12 μm in thickness.

In one example, the flexible substrate comprises a thin film of a polymer, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In one example, the film of polymer is about 100 μm in thickness.

In one example, the flexible substrate comprises an image or information printed on a first surface of the flexible substrate in a liquid electrophotographic printing process using a liquid electrophotographic composition as described herein. The image or information may be reverse printed onto the first surface of the substrate. The polymer resin of the printed composition may thus be available for thermally laminating the flexible substrate to the base layer or functional substrate described below, with a second surface of the flexible substrate forming the outermost surface of the flexible packaging material and the printed image or information appearing the right way round when viewed through the flexible substrate. In this way, the printed image or information is embedded within the multi-layer structure of the flexible packaging material and not on the outermost surface, and thus protected from damage.

Liquid Electrophotographic Printing (LEP) Composition

The liquid electrophotographic printing composition (also referred to herein as a LEP composition) useful in the methods described herein to form flexible packaging materials also described generally comprises a colorant or pigment, a polymer resin and a carrier fluid or liquid. The LEP composition may further comprise one or more additives such as charge directors, charge adjuvants, surfactants, viscosity modifiers, emulsifiers and the like. In some examples, the LEP composition may not contain any pigment, or comprise substantially zero pigment and thus be a pigment-free composition, useful in providing a particular transparent gloss or sheen to a printed substrate.

Each of these components will be described separately in the sub-sections which follow.

Colorant

The liquid electrophotographic ink composition may comprise a colorant. The colorant may be a dye or pigment. The colorant can be any colorant compatible with the liquid carrier and useful for electrophotographic printing. For example, the colorant may be present as pigment particles, or may comprise a resin (in addition to the polymers described herein) and a pigment. The resins and pigments can be any of those commonly used as known in the art. In some examples, the colorant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200.

In some examples, the colorant or pigment particles may have a median particle size or $d_{50}$ of less than 20 µm, for example less than 15 µm, for example less than 10 µm, for example less than 5 µm, for example less than 4 µm, for example less than 3 µm, for example less than 2 µm, for example less than 1 µm, for example less than 0.9 µm, for example less than 08 µm, for example less than 0.7 µm, for example less than 0.6 µm, for example less than 0.5 µm. Unless otherwise stated, the particle size of the colorant or pigment particle and the resin coated pigment particle is determined using laser diffraction on a Malvern Mastersizer 2000 according to the standard procedure as described in the operating manual.

The colorant or pigment particle may be present in the method and/or electrostatic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and colorant. In some examples, the colorant or pigment particle may be present in the method and/or electrostatic ink composition in an amount of at least 50 wt % of the total amount of resin and colorant or pigment, for example at least 55 wt % of the total amount of resin and colorant or pigment.

Polymer Resin

The liquid electrophotographic printing composition comprises a polymer resin comprising a copolymer of an alkylene monomer and a monomer selected from acrylic acid and methacrylic acid. The polymer resin may be referred to as a thermoplastic polymer. A thermoplastic polymer is sometimes referred to as a thermoplastic resin. In some examples, the polymer may comprise one or more of ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin comprises a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples 10% to 40% by weight of the total amount of the resin polymers, e.g. thermoplastic resin polymers, in the liquid electrophotographic composition and/or the ink composition printed on the print substrate, in some examples 5% to 30% by weight of the total amount of the resin polymers, e.g. thermoplastic resin polymers, in the liquid electrophotographic composition and/or the ink composition printed on the print substrate, in some examples 5% to 15% by weight of the total amount of the resin polymers, e.g. thermoplastic resin polymers, in the liquid electrophotographic composition and/or the ink composition printed on the print substrate in some examples 15% to 30% by weight of the total amount of the resin polymers, e.g. thermoplastic resin polymers, in the liquid electrophotographic composition and/or the ink composition printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the liquid electrophotographic composition and/or the ink composition printed on the print substrate. The resin can constitute about 60 to 95%, in some examples about 70 to 95%, by weight of the solids of the liquid electrophotographic composition and/or the ink composition printed on the print substrate.

Carrier Liquid

In some examples, the LEP composition comprises resin coated pigment particles, or resin particles, which are formed in and/or dispersed in a carrier fluid or carrier liquid. Before application to the print substrate in the electrostatic printing process, the composition may be an electrostatic ink composition, which may be in dry form, for example in the form of flowable pigment particles coated with the thermoplastic resin. Alternatively, before application to the print substrate in the electrostatic printing process, the electrostatic ink composition may be in liquid form; and may comprise a carrier liquid in which is suspended pigment particles coated with the thermoplastic resin.

Generally, the carrier liquid acts as a reaction solvent in preparing the coated pigment particles, and can also act as a dispersing medium for the other components in the resulting electrostatic ink composition. In one example, the carrier liquid is a liquid which does not dissolve the polymer resin at room temperature. In one example, the carrier liquid is a liquid which dissolves the polymer resin at elevated temperatures. For example, the polymer resin may be soluble in the carrier liquid when heated to a temperature of at least 80° C., for example 90° C., for example 100° C., for example 110° C., for example 120° C. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-S™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic ink composition, in some examples 50% to 99.5% by weight of the electrostatic ink composition. Before printing, the carrier liquid may constitute about 40 to 90% by weight of the electrostatic ink composition. Before printing, the carrier liquid may constitute about 60% to 80% by weight of the electrostatic ink composition. Before printing, the carrier liquid may constitute about 90% to 99.5% by weight of the electrostatic ink composition, in some examples 95% to 99% by weight of the electrostatic ink composition.

The ink, when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Charge Director and Charge Adjuvant

The liquid electrophotographic composition and/or the ink composition printed on the print substrate can comprise a charge director. A charge director can be added to an electrostatic composition to impart a charge of a desired polarity and/or maintain sufficient electrostatic charge on the particles of an electrostatic ink composition. The charge director may comprise ionic compounds, including, but not limited to, metal salts of fatty acids, metal salts of sulfosuccinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director can be selected from, but is not limited to, oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates (e.g. see WO 2007/130069). The charge director can impart a negative charge or a positive charge on the resin-containing particles of an electrostatic ink composition.

The charge director can comprise a sulfosuccinate moiety of the general formula:

$[R_a—O—C(O)CH_2CH(SO_3^-)C(O)—O—R_b]$, where each of $R_a$ and $R_b$ is an alkyl group. In some examples, the charge director comprises nanoparticles of a simple salt and a sulfosuccinate salt of the general formula $MA_n$, wherein M is a metal, n is the valence of M, and A is an ion of the general formula $[R_a—O—C(O)CH_2CH(SO_3^-)C(O)—O—R_b]$, where each of $R_a$ and $R_b$ is an alkyl group, or other charge directors as found in WO2007130069, which is incorporation herein by reference in its entirety. As described in WO2007130069, the sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, $NH_4$, tert-butyl ammonium, $Li^+$, and Ar, or from any sub-group thereof. The simple salt may comprise an anion selected from $SO_4^{2-}$, $PO^{3-}$, $NO_3^-$, $HPO_4^{2-}$, $CO_3^{2-}$, acetate, trifluoroacetate (TFA), $Cl^-$, Bf, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, LiTFA, $Al_2(SO_4)_3$, $LiClO_4$ and $LiBF_4$, or any sub-group thereof. The charge director may further comprise basic barium petronate (BBP).

In the formula $[R_a—O—C(O)CH_2CH(SO_3^-)C(O)—O—R_b]$, in some examples, each of $R_a$ and $R_b$ is an aliphatic alkyl group. In some examples, each of $R_a$ and $R_b$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_a$ and $R_b$ are the same. In some examples, at least one of $R_a$ and $R_b$ is $C_{13}H_{27}$. In some examples, M is Na, K, Cs, Ca, or Ba. The formula $[R_a—O—C(O)CH_2CH(SO_3^-)C(O)—O—R_b]$ and/or the formula $MA_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In an electrostatic ink composition, the charge director can constitute about 0.001% to 20%, in some examples 0.01 to 20% by weight, in some examples 0.01 to 10% by weight, in some examples 0.01 to 1% by weight of the solids of the electrostatic ink composition and/or ink composition printed on the print substrate. The charge director can constitute about 0.001 to 0.15% by weight of the solids of the liquid electrophotographic ink composition and/or ink composition printed on the print substrate, in some examples 0.001 to 0.15%, in some examples 0.001 to 0.02% by weight of the solids of the liquid electrophotographic ink composition and/or ink composition printed on the print substrate. In some examples, the charge director imparts a negative charge on the electrostatic ink composition. The particle conductivity may range from 50 to 500 μmho/cm, in some examples from 200-350 pmho/cm.

The liquid electrophotographic ink composition and/or ink composition printed on the print substrate can include a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic ink composition and/or ink composition printed on the print substrate. The charge adjuvant can constitute about 0.5 to 4% by weight of the solids of the liquid electrophotographic ink composition and/or ink composition printed on the print substrate. The charge adjuvant can constitute about 1 to 3% by weight of the solids of the liquid electrophotographic ink composition and/or ink composition printed on the print substrate.

Other Additives

The electrophotographic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Polymeric Base Layer

The polymeric base layer of the flexible packaging material may also be referred to as a functional substrate or simply a base material or base layer. The base layer of the flexible packaging material may be the innermost layer of the flexible packaging material in use, and may thus be in contact with the packaged goods. In one example the base layer is referred to as a functional substrate and is functional in the sense that it provides a barrier function to protect the packaged goods. The base layer or functional substrate may serve as a barrier to any external influence that could damage or otherwise reduce the quality of the packaged goods, in particular food, by preventing ingress of, for example, moisture, oxygen, other oxidants and pathogens such as viruses and bacteria.

In one example, the base material used in the process to prepare the flexible packaging material comprises an extrudable material, for example a plastics material. In one example, the base material comprises a thermoplastics material which is processable in an extruding process. In one example the base material comprises a thin film of a plastic material, for example, a polymer comprising an alkylene monomer. In one example, the polymer comprises polyethylene (PE), linear low density polyethylene (LLDPE), low density polyethylene (LDPE), polypropylene (PP), or biaxially oriented polypropylene (BOPP). In one example, the base material comprises a copolymer or blend of one or more of the foregoing materials. These should be seen as non-limiting examples only, with other extrudable polymeric materials being known in the art as being suitable for use in flexible packaging materials and processes for preparing them.

In one example, the polymeric base layer comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In one example, the film of polymer is about 12 μm in thickness.

In one example, the polymeric base layer comprises a thin film of a polymer, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In one example, the film of polymer is about 100 μm in thickness.

In one example, the base layer of the flexible packaging material comprises a sealant layer on a surface thereof other than the surface on which the thermally activatable laminating layer is applied. In this example, the sealant layer is disposed on the innermost surface of the flexible packaging material and serves to provide means for sealing the flexible packaging material to itself or another material, with the goods to be packaged inside. In one example the sealant layer comprises a film of low-melting, i.e. heat sealable, thermoplastic material. Suitable thermoplastic materials include those described herein in connection with the polymer resin and/or the thermally activatable laminating material and include polymers of ethylene, or DuPont's SURLYN® ionomers. In one example, the sealant layer comprises an extrudable material.

In one example, the sealant layer comprises a thin film of a polymer, wherein the film is less than 100 μm in thickness, for example less than 90 μm in thickness, less than 80 μm in thickness, less than 70 μm in thickness, less than 60 μm in thickness, less than 50 μm in thickness, less than 40 μm in thickness, less than 30 μm in thickness, less than 20 μm in thickness, less than 15 μm in thickness. In one example, the film of polymer is about 12 μm in thickness.

In one example, the sealant layer comprises a thin film of a polymer, wherein the film is greater than 12 μm in thickness, for example greater than 15 μm in thickness, greater than 20 μm in thickness, greater than 30 μm in thickness, greater than 40 μm in thickness, greater than 50 μm in thickness, greater than 60 μm in thickness, greater than 70 μm in thickness, greater than 80 μm in thickness, greater than 90 μm in thickness. In one example, the film of polymer is about 100 μm in thickness.

Thermally Activatable Laminating Layer

The flexible packaging material and the processes for preparing the flexible packaging material comprise a thermally activatable laminating layer, also referred to as a thermal laminating material or layer or thermally activatable laminating material.

In one example, the thermally activatable laminating layer comprises a polymer resin, for example a thermoplastic polymer resin. In some examples the thermally activatable laminating layer comprises a low-melting polymer. The term "low-melting polymer" is to be understood as a polymeric material which is solid at room temperature but melts at a temperature typically obtainable in a printing or laminating apparatus.

In some examples, the thermally activatable laminating layer or material may comprise a low-melting polymer with a melting point of less than about 200° C., for example less than about 190° C., for example less than about 180° C., for example less than about 170° C., for example less than about 160° C., for example less than about 150° C., for example less than about 140° C., for example less than about 130° C., for example less than about 120° C., for example less than about 110° C., for example less than about 100° C., for example less than about 90° C., for example about 80° C.

In some examples, the thermally activatable laminating layer or material may comprise a low-melting polymer with a melting point of greater than about 80° C., for example greater than about 90° C., for example greater than about 100° C., for example greater than about 110° C., for example greater than about 120° C., for example greater than about 130° C., for example greater than about 140° C., for example greater than about 150° C., for example greater than about 160° C., for example greater than about 170° C., for example greater than about 180° C., for example greater than about 190° C., for example about 200° C.

By using a low-melting polymer as the thermally activatable laminating material to form the thermally activatable laminating layer, it becomes possible to co-extrude the thermally activatable laminating material with the polymeric base material to simultaneously in one step form a layered structure for laminating to the printed substrate.

In one example, the thermally activatable laminating layer comprises a thin film of a polymer, wherein the film is less than 200 μm in thickness, for example less than 180 μm in thickness, less than 160 μm in thickness, less than 140 μm in thickness, less than 120 μm in thickness, less than 100 μm in thickness, less than 80 μm in thickness, less than 60 μm in thickness, less than 40 μm in thickness, less than 30 μm in thickness, less than 20 μm in thickness, less than 10 μm in thickness. In one example, the film of polymer is about 3 μm in thickness.

In one example, the thermally activatable laminating layer comprises a thin film of a polymer, wherein the film is greater than 3 μm in thickness, for example greater than 10 μm in thickness, greater than 20 μm in thickness, greater than 30 μm in thickness, greater than 40 μm in thickness, greater than 60 μm in thickness, greater than 80 μm in thickness, greater than 100 μm in thickness, greater than 120 μm in thickness, greater than 140 μm in thickness, greater than 160 μm in thickness, greater than 180 μm in thickness. In one example, the film of polymer is about 200 μm in thickness.

In one example, the thermally activatable laminating layer comprises a thin film of a polymer, wherein the film has a coating weight of less than 50 grams per square metre (gsm), for example less than 40 gsm for example less than 30 gsm for example less than 20 gsm for example less than 15 gsm for example less than 10 gsm for example less than 9 gsm for example less than 9 gsm, less than 8 gsm, less than 7 gsm, less than 6 gsm, less than 5 gsm, less than 4 gsm, less than 3 gsm. In one example, the weight of the film of polymer is about 2 gsm.

In one example, the thermally activatable laminating layer comprises a thin film of a polymer, wherein the film is greater than 2 gsm in weight, for example greater than 3 gsm, greater than 4 gsm, greater than 5 gsm, greater than 6 gsm, greater than 7 gsm, greater than 8 gsm, greater than 9 gsm, greater than 10 gsm, greater than 15 gsm, greater than 20 gsm, greater than 30 gsm, greater than 40 gsm. In one example, the weight of the film of polymer is about 50 gsm.

In some examples, the polymer may be selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers, urethane polymers and combinations thereof.

The thermally activatable laminating layer or material may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The thermally activatable laminating layer or material may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The thermally activatable laminating layer or material may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The thermally activatable laminating layer or material may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The thermally activatable laminating layer or material may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the thermally activatable laminating layer or material comprises a single type of polymer, the polymer may have a melt viscosity of 6000 poise or more, in some examples a melt viscosity of 8000 poise or more, in some examples a melt viscosity of 10000 poise or more, in some examples a melt viscosity of 12000 poise or more. If the thermally activatable laminating layer or material comprises a plurality of polymers all the polymers may together form a mixture that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The thermally activatable laminating layer or material may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The thermally activatable laminating layer or material may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The thermally activatable laminating layer or material may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The thermally activatable laminating layer or material may comprise a thermoplastic polyurethane. Thermoplastic polyurethanes are formed during a polyaddition reaction between a diisocyanate, a polyol or long-chain diol and a chain extender or short-chain diol. Suitable thermoplastic polyurethanes include the Irogran®, Avalon®, Krystalgran® and Irostic® families available from Huntsman, and the Pureseal family of polymers from Ashland.

The thermoplastic polyurethane may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the thermally activatable laminating material can in some examples be selected from the Nucrel family of polymers (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the AC family of polymers (e.g. AC-5120, AC-5180, AC-540, AC-580 (sold by Honeywell)), the Aclyn family of polymers (e.g. Aclyn 201, Aclyn 246, Aclyn 285, and Aclyn 295), and the Lotader family of polymers (e.g. Lotader 2210, Lotader, 3430, and Lotader 8200 (sold by Arkema)), the Lotryl family of polymers (e.g. Lotryl MA03 (sold by Arkema)), the Escor family of polymers (e.g. Escor 5020 7.5% (sold by Exxon Mobil), the Escorene family of polymers (e.g. Escorene Ultra FL00328 sold by Exxon Mobil), the Acryft family of polymers (e.g. Acryft WH303 sold by Sumitomo), the Tafmer family of polymers (e.g. Tafmer MA9015 (sold by Mitsui)) and the Surlyn family of polymers (e.g. Surlyn 1652 (sold by DuPont)).

Process for Preparing a Flexible Packaging Material

Described herein is a process for preparing a flexible packaging material, comprising:
  printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
  co-extruding a polymeric base material with a thermally activatable laminating material to form a thermally activatable laminating layer disposed on a polymeric base layer; and
  contacting under conditions of heat and/or pressure the thermally activatable laminating layer with the first surface of the flexible substrate comprising the printed electrophotographic ink composition.

Also described herein is a process for preparing a flexible packaging material, comprising:
  providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
  providing a second flexible material comprising a polymeric base layer co-extruded with a thermally activatable laminating layer; and
  contacting under conditions of heat and/or pressure the thermally activatable laminating layer with the first surface of the substrate comprising the printed electrophotographic ink composition.

The processes of the present disclosure are depicted generally in FIG. 1, in which the following reference numerals are used to identify the features indicated: reference numeral "1" denotes a flexible material comprising a polymeric base layer or material; reference numeral "2" denotes a thermally activatable laminating layer or material; reference numeral "3" denotes a flexible or print substrate; reference numeral "4" denotes a electrophotographic ink composition and reference numeral "5" denotes a flexible packaging material.

FIG. 1 depicts a process in which a polymeric base material 1 is co-extruded with a thermally activatable laminating material 2. The thermally activatable laminating layer 2 is then contacted with a first surface of a flexible or print substrate 3 comprising a printed electrophotographic ink composition 4 in a thermal laminating step to form a flexible packaging material 5. Each step of the process will be described in more detail below.

In one example, a process for preparing a flexible packaging material comprises a step of printing a liquid electrophotographic ink composition onto a first surface of a flexible substrate, or providing a first flexible material comprising a substrate and an electrophotographic ink composition printed onto a first surface of the substrate.

In one example, the substrate comprises a flexible substrate as described herein previously. In one example, the liquid electrophotographic ink composition used in the process comprises a composition as described herein previously. The liquid electrophotographic ink composition may be printed onto the first surface of the flexible substrate in a conventional electrophotographic or electrostatic printing process using a conventional electrophotographic or electrostatic printing apparatus. Examples of suitable electrophotographic or electrostatic printing equipment are the HP Indigo digital presses.

In one example, the flexible substrate comprises a transparent material and the liquid electrophotographic ink composition is printed onto a first surface thereof in a reverse printing process such that the printed image or information appears correct when viewed through the flexible substrate. By using the reverse printing process, and thermally laminating the printed surface of the flexible substrate to the functional substrate (as described below), the printed image or information is viewed correctly in the final product and is protected from damage by the flexible substrate which forms the outermost layer of the packaging material. The flexible substrate comprising the printed image or information can be wound onto a roll or spool and stored until the laminating step is carried out, if required.

In one example, a process for preparing a flexible packaging material comprises a step of co-extruding a polymeric base material with a thermally activatable laminating material to form a thermally activatable laminating layer disposed on a polymeric base layer, or providing a second flexible material comprising a polymeric base layer co-extruded with a thermally activatable laminating layer. The term "co-extrusion", as used herein, is to be understood as meaning separately melting two or more materials and passing them through separate extrusion dies in such a manner that the materials form a structure, for example a film, of defined layers of different materials. The separately extruded materials may be delivered to a single extrusion head or die which extrudes the materials in the final, desired form. The materials from each extruder do not mix in the final extrusion die. Instead, the material layers are combined and flow out of the die as a stacked multilayer product. Such processes and machinery for producing such materials are known in the art.

In one example, the polymeric base material or the polymeric base layer comprises a material or base layer as described previously. In one example, the thermally activatable laminating layer or thermally activatable laminating material comprise a layer or material as described previously.

The step of co-extrusion of these materials to form a layered structure can be performed using any apparatus suited to co-extrusion to form layered films. Such machinery is known in the art. In the example in which one or both of the polymeric base material and thermally activatable laminating material comprise a blend of materials, each component of the polymeric base material or thermally activatable laminating material may be melt blended and then extruded to form pellets of blended polymeric base material and/or pellets of thermally activatable laminating material. These pellets may then be used in the co-extrusion step to form a thermally activatable laminating layer disposed on a polymeric base layer.

In an alternative example, the polymeric base material or thermally activatable laminating material may each comprise a blend of materials, the blend being achieved by dry blending pellets of each component and adding the mixture of pellets to the extruding machine used to co-extrude the materials and form the layered structure of a thermally activatable laminating layer disposed on a polymeric base layer.

In one example, the step of co-extruding a polymeric base material with a thermally activatable laminating material to form a thermally activatable laminating layer disposed on a polymeric base layer may further comprise co-extrusion of a sealant material to form a sealant layer disposed on a surface of the polymeric base material other than the surface on which the thermally activatable laminating layer is disposed. The material used to form the sealant layer may be as described previously. Thus, in this example, the step of co-extrusion comprises co-extrusion of a polymeric base material, a thermally activatable laminating material and a sealant material in such a manner that a multi-layer or trilayer material is obtained in which a polymeric base layer has a thermally activatable laminating layer disposed on a first surface and a sealant layer disposed on a surface other than the first surface.

In one example, a process for preparing a flexible packaging material comprises a step of contacting under conditions of heat and/or pressure the thermally activatable laminating layer with the first surface of the flexible substrate comprising the printed electrophotographic ink composition. This step may be referred to as a laminating step or a thermal laminating step. The result of this step is a thermally laminated flexible packaging material, which, as mentioned previously, comprises the flexible substrate as the intended outermost layer of the packaging in use, thus protecting from damage the printed image or information formed by the electrophotographic ink composition. In one example, the flexible substrate comprising the printed image or information is brought into a particular alignment with the polymeric base layer or functional substrate comprising the thermally activatable laminating layer before being subjected to the thermal laminating step.

In one example, the step of contacting under conditions of heat and/or pressure the thermally activatable laminating layer with the first surface of the flexible substrate comprising the printed electrophotographic ink composition produces the flexible packaging material which is ready for use immediately upon cooling to room temperature. Thus, in one example, the processes for preparing a flexible packaging material described herein require no additional curing time, or zero curing time. The presently described processes are therefore advantageous over existing methods for producing flexible packaging materials containing LEP printed images or information in which laminating adhesives are used. Such laminating adhesives, both "solvent-based" and "solvent-free" adhesives require curing times of at least several days, thus removing the advantage of speed that digital printing can offer.

In one example, a process for preparing a flexible packaging material comprises a step of contacting under conditions of heat and/or pressure the thermally activatable laminating layer with the first surface of the flexible substrate comprising the printed electrophotographic ink composition, and a step of cooling the thermally laminated flexible packaging material to room temperature, thereby obtaining a ready-to-use flexible packaging material.

In one example, the laminating step may be carried out on any apparatus suited for performing such a task. Suitable laminating equipment for preparing flexible packaging comprising laminated materials is known in the art. The laminating apparatus on which the thermal laminating step may be carried out may comprise pre-heating rolls, heating or nip rolls, and chill or cooling rolls through which the thermally laminated multilayer material passes, to further speed up the cooling process. The laminating step carried out on the nip roll may be carried out at a temperature and a pressure required to partially melt the thermally activatable laminating material and/or the polymer resin of the electrophotographic ink composition printed on the flexible substrate at the laminating nip, and thereby create a bond between the materials.

In one example, the temperature for the laminating nip or step may be less than about 150° C., for example less than about 120° C., for example less than about 110° C., for example less than about 100° C., for example less than about 90° C., for example about 80° C.

In one example, the temperature for the laminating nip or step may be greater than about 80° C., for example greater than about 90° C., for example greater than about 100° C., for example greater than about 110° C., for example greater than about 120° C., for example about 150° C. It will be understood that the temperature required for efficient thermal lamination will depend on the nature or composition of the thermally activatable laminating material and/or the polymer resin of the electrophotographic ink composition and the associated melting temperatures.

In one example, the pressure for the laminating nip or step may be less than about 10 bar, for example less than about 9 bar, for example less than about 8 bar, for example less than about 7 bar, for example less than about 6 bar, for example less than about 5 bar, for example less than about 4 bar, for example less than about 3 bar, for example about 2 bar.

In one example, the pressure for the laminating nip or step may be greater than about 2 bar, for example greater than about 3 bar, for example greater than about 4 bar, for example greater than about 5 bar, for example greater than about 6 bar, for example greater than about 7 bar, for example greater than about 8 bar, for example greater than about 9 bar, for example about 10 bar. It will be understood that the temperature and pressure required for efficient thermal lamination will depend on the nature or composition of the thermally activatable laminating material and the associated melting temperature.

EXAMPLES

The following illustrates examples of the methods and related aspects described herein. Thus, these examples should not be considered as limitations of the present disclosure, but are merely in place to teach how to make examples of compositions of the present disclosure. As such, a representative number of compositions and their method of manufacture are disclosed herein.

Materials

Polymers/Resins: Nucrel 699 is a ethylene-methacrylic acid (EMA) copolymer available from DuPont; AC-5120 is an ethylene acrylic acid copolymer (EAA) resin available from Honeywell; Escor 5020 7.5% is a ethylene-acrylic acid copolymer (EAA) available from Exxon Mobil; Lotryl MA03 is a ethylene-methacrylic acid copolymer (EMA) available from Arkema; Acryft WH303 is a ethylene methyl methacrylate copolymer (EMMA) from Sumitomo; Tafmer MA9015 is an acid modified olefin elastomer from Mitsui; Tafmer XM7070 is a polypropylene and 1-butene copolymer from Mitsui company; Admer is a functionally modified polyolefin available from Mitsui, and Escorene Ultra FL 00328 is an ethylene vinyl acetate (EVA) copolymer from Exxon Mobil.

PP/LDPE/LLDPE used as polymeric base layers were commercially available resins, obtainable from, for example ExxonMobil under grade names PP1013H1, LDPE LD 150 Series, and LLDPE LL 1001 Series.

PET, BOPP and BOPA films used as print substrates were commercially available films, obtainable from, for example Poliplex Corporation (PET; 12 micron film)), Dor Film (BOPP; 18-40 microns) and Xiamen Changsu Industry, China (BOPA) or Hyosung, South Korea (BOPA).

Electrophotographic ink composition: toner particles comprising pigment encapsulated by polymer resin blends comprising Nucrel 699 and AC-5120 (in a ratio of 4:1) were dispersed in Isopar-L™, from Exxon.

Apparatus

Coextruder: Dr Collins GMBH extruder

Printing press: HP Indigo WS6600,

Laminator: LaboCombi 400 from Nordmeccanica.

General Methodology

An example procedure will now be described in which a flexible packaging material of the form: PET/Primer-INK/Lotryl 29MA03-LDPE-LDPE is produced, in which PET is a print substrate; Primer-INK is an electrostatically printed ink composition, printed onto a surface of the PET which has been primed to improve adhesion; Lotryl 29MA03 is a thermally activatable laminating material; and two layers of LDPE, one acting as a base layer and one as a sealant layer.

Step 1: Coextrusion of Base Material and Thermally Activatable Laminating Material

TABLE 1

| Operating parameters for Dr Collins GMBH extruder | |
|---|---|
| Parameter | Value |
| Rewinder Tension (N) | 17 |
| Chill roll temp (° C.) | 30 |
| Corona Tr. [W] | NA |
| Die temp [(° C.) | 235 |
| Die height [mm] | 107 |
| Extruder A temp (° C.) | 220 |
| Extruder B temp (° C.) | 250 |
| Extruder C temp (° C.) | 260 |
| RPM [A, B, C] | 25-78 |
| Die pressure [bar] | 30-45 |
| Nip pressure (bar) | 5 |
| Pressure roll temp (° C.) | NA |
| Corona A (W) | 0-2000 |

TABLE 2

| Coextrusion compositions | | | | | |
|---|---|---|---|---|---|
| Layer | Composition | Material Material | Station % | | |
| Sealant | Compound A | LDPE | Dosing B1 | 98.25 | Ex-A |
| | | A. Block | Dosing B2 | 1 | 4.5", 20 |
| | | Slip Agent | B3 | 0.75 | g/m² |
| Base | Compound B | LDPE | Dosing A1 | 100 | Ex-B |
| | | A. Block | Dosing A2 | 0 | 4.5", 50 g/m² |
| TALM | Compound C | Slip | Dosing A3 | 0 | Ex-C |
| | | A. Block | Dosing B2 | 0 | 4.5", 20 |
| | | Lotryl | Dosing B4 | 100 | g/m² |

The result of the above processes is a coex 3-ply PE film with top ply of "thermally activatable laminating material"—TALM/LDPE/LDPE/20-50-20 [microns], which will be used as the second substrate.

Step 2: Printing Step

1. Test parameters

Primer: DP050 from Michelman

Print substrates: PET 12 μm, BOPP transparent 20 μm

Blanket: Iris+

TABLE 3

| Print substrate definitions | | |
|---|---|---|
| | PET | BOPP |
| Type | film | film |
| Material | PET | BOPP |
| Face-stock | transparent | transparent |
| Gloss level | semi-matte | semi-matte |
| Second transfer [kg] | 250 | 250 |
| Blanket Temp [° C.] | 105 | 105 |
| Feed Fan [V] | 8 | 8 |
| PTH [° C.] | off | off |
| Thickness [μm] | 12 | 20 |

TABLE 4

| Inline primer unit (ILP) definitions | | | | |
|---|---|---|---|---|
| Intermediate Coating roller | Drying temp. (° C.) | Coating level | Heat sensitivity | Corona (W) |
| 82 mm rough surface | 80 | High | High | 400 |

Print Procedure
1.1. Install the required substrate and measure surface energy on outer side with dyne pens.
1.2. Change substrate and ILP definitions according to tables above
1.3. Remove coating roller from ILP coating system
1.4. Activate ILP unit
1.5. Apply corona refreshment by operating ILP with system web feed (SWF)
1.6. Measure surface energy of the treated substrate
1.7. Install back ILP coating roller
1.8. Prime about 5 m of substrate without printing with SWF
1.9. Take samples of the primed substrate for coat weight measurements and appearance evaluation
1.10. Target coat weight 0.20±0.02 gsm.
1.11. Perform $1^{st}$ and $2^{nd}$ transfer calibrations
1.12. Perform full colour adjustment and measure OD values with X-Rite
1.13. Print job
1.14. After printing remove roll to laminator for next step.

TABLE 5

| Target OD values | | | | | |
|---|---|---|---|---|---|
|  | Y | M | C | K | W |
| Target OD values | 0.95 ± 0.05 | 1.3 ± 0.05 | 1.3 ± 0.05 | 1.5 ± 0.05 | 0.38 ± 0.05 |
| X-Rite screen | Y | M | C | K | C |

Step 3: Thermal Lamination with Zero Cure Time

In this process the printed substrate is laminated to the coextruded film by energy (heat and pressure) in order to joint together two ingredient and create a laminate with zero cure time with 100% food safety and high performance thermo mechanic characteristic that important in flexible packaging industry.

1. Place printed substrate in unwinder A and second substrate in unwinder B, allow laminator nip to reach the required temperature.
2. Operate the laminator for thermal lamination.
3. Complete lamination and follow sample measurements.
4. Final film configuration is: PET/Primer-INK/Lotryl 29MA03-LDPE-LDPE

TABLE 6

| Lamination operation parameters | |
|---|---|
| Parameter | Value |
| Unwinder A Tension (N) | 13 |
| Unwinder B Tension (N) | 9 |
| Rewinder Tension (N) | 16 |
| Nip temperature (° C.) | 133 |
| Nip pressure (bar) | 5 |
| Lamination speed (m/min) | 50 |
| Corona A (KW) | 2 |
| Corona B (KW) | 1.5 |

Flexible packaging materials were prepared according to the general methodology described above, and as set out in Table 7 below.

The laminate performance was verified at zero cure time by measuring the lamination bond strength immediately after the laminated material had cured to room temperature. Lamination bond strength was measured according to ASTM F0904-98R08 (results are shown in Table 7).

The results suggest that the thermally activated polymers/co-polymers that melt at temperatures of ~80-120° C. melt along with the electrophotographic ink composition in the laminating nip, bond to each other, and after cooling maintain bond strength values which are acceptable for many flexible packaging applications and are comparable to values measured with standard lamination techniques.

Pouch/Tray making/Packaging:

The flexible packaging materials described herein can be used directly/immediately for:

Pouch making—Premade pouch.

Pouch making—FFS=Form Fill & Seal

Lid=top lid for tray/cup.

TABLE 7

| Examples (Ink layer thickness not included) | | | | |
|---|---|---|---|---|
| Example | Final laminate | Thickness [μ] | TALM | Lamination str. [N/inch] |
| 1 | PET/INK/EAA – LDPE – [LLDPE + LDPE] | 12/11 - 40 - 10 | Escor 5020 7.5%, | 3.7 |
| 2 | PET/INK/EMA – LDPE – LDPE + LLDPE | 12/15/60/15 | Lotryl MA03. | 5.35 |
| 3 | PET/INK/EAA – LDPE – [LLDPE + LDPE] | 12/8 - 25 - 8 | Nucrel, | 2.9 |
| 4 | PET/INK/Ionomer – LDPE – Ionomer | 12/9 - 40 - 9 | Surlyn 1652, | 5 |
| 5 | BOPP/INK/Tafmer – LDPE – LDPE + Metalocen | 20/11 - 50 - 11 | Tafmer MA9015, | 7 |
| 6 | PET/INK/Tafmer – LDPE – LDPE + Metalocen | 12/14 - 60 - 15 | Tafmer MA9015, | 5 |
| 7 | PET/INK Admer – PP – PP | 12/14 - 60 - 15 | Admer | 7 |

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims or any and/or any of the independent claims.

The invention claimed is:

1. A flexible packaging material, comprising:
  a flexible substrate comprising a first surface;
  an electrophotographic ink composition printed on the first surface of the flexible substrate, the printed electrophotographic ink composition comprising a polymer resin comprising a copolymer of an alkylene monomer and a monomer selected from acrylic acid and methacrylic acid;
  a polymeric base layer; and
  a thermally activatable laminating layer co-extruded with the polymeric base layer and thermally laminated to the first surface of the flexible substrate printed with the electrophotographic ink composition, the thermally activatable laminating layer comprising a copolymer of an alkylene monomer and a monomer selected from acrylic acid and methacrylic acid.

2. The flexible packaging material of claim 1, wherein the polymeric base layer comprises a polyethylene or polypropylene based polymer.

3. The flexible packaging material of claim 1, wherein the flexible substrate comprises a film of thermoplastics material.

4. The flexible packaging material of claim 1, wherein the flexible substrate comprises a film of biaxially oriented polypropylene or poly(ethylene) terephthalate.

5. The flexible packaging material of claim 1, wherein the thermally activatable laminating layer is from 3 to 200 μm in thickness.

6. The flexible packaging material of claim 1, further comprising a sealant layer disposed on a surface of the polymeric base layer other than the surface on which the thermally activatable laminating layer is disposed.

7. A process for preparing a flexible packaging material, comprising:
  printing a liquid electrophotographic ink composition onto a first surface of a flexible substrate, wherein the liquid electrophotographic ink composition comprises a polymer resin comprising a copolymer of an alkylene monomer and a monomer selected from acrylic acid and methacrylic acid;
  co-extruding a polymeric base material with a thermally activatable laminating material to form a thermally activatable laminating layer disposed on a polymeric base layer, the thermally activatable laminating layer comprising a copolymer of an alkylene monomer and a monomer selected from acrylic acid and methacrylic acid, and the polymeric base layer being formed from the polymeric base material; and
  contacting under conditions of heat and/or pressure the thermally activatable laminating layer with the first surface of the flexible substrate comprising the printed electrophotographic ink composition.

8. The process for preparing a flexible packaging material of claim 7, wherein the polymeric base material comprises a polyethylene or polypropylene based polymer.

9. The process for preparing a flexible packaging material of claim 7, further comprising co-extruding a sealant material with the polymeric base material and the thermally activatable laminating material to form a sealant layer disposed on a surface of the polymeric base layer other than the surface on which the thermally activatable laminating layer is disposed.

10. The process for preparing a flexible packaging material of claim 7, wherein the thermally activatable laminating layer is contacted with the first surface of the flexible substrate comprising the printed electrophotographic ink composition at a temperature of less than 150° C.

11. The process for preparing a flexible packaging material of claim 7, further comprising cooling the material obtained from the step of contacting the thermally activatable laminating layer with the first surface of the flexible substrate comprising the printed electrophotographic ink composition, thereby producing the flexible packaging material.

12. A process for preparing a flexible packaging material, comprising:
  providing a first flexible material comprising a substrate and an electrophotographic ink composition printed onto a first surface of the substrate, wherein the printed electrophotographic ink composition comprises a polymer resin comprising a copolymer of an alkylene monomer and a monomer selected from acrylic acid and methacrylic acid;
  providing a second flexible material comprising a polymeric base layer co-extruded with a thermally activatable laminating layer, the thermally activatable laminating layer comprising a copolymer of an alkylene monomer and a monomer selected from acrylic acid and methacrylic acid; and
  contacting under conditions of heat and/or pressure the thermally activatable laminating layer with the first surface of the substrate comprising the printed electrophotographic ink composition.

13. A flexible packaging material made by the process of claim 7.

14. A flexible packaging material made by the process of claim 12.

15. The flexible packaging material of claim 6, wherein the sealant layer comprises a copolymer of an alkylene monomer and a monomer selected from acrylic acid and methacrylic acid.

16. The flexible packaging material of claim 6, wherein the sealant layer comprises a polymer selected from the group consisting of ethylene or propylene acrylic acid co-polymers; ethylene or propylene methacrylic acid co-polymers; ethylene vinyl acetate co-polymers; co-polymers of ethylene or propylene, and an alkyl ester of methacrylic or acrylic acid; co-polymers of ethylene, acrylic or methacrylic acid, and an alkyl ester of methacrylic or acrylic acid; co-polymers of ethylene or propylene and maleic anhydride; polyethylene; polystyrene; isotactic polypropylene; co-polymers of ethylene ethyl acrylate; polyesters; polyvinyl toluene; polyamides; styrene/butadiene co-polymers; epoxy resins; acrylic resins; ethylene-acrylate terpolymers: ethylene-acrylic esters-maleic anhydride (MAH) terpolymers; glycidyl methacrylate (GMA) terpolymers; ethylene-acrylic acid ionomers; urethane polymers; and combinations thereof.

17. A flexible packaging material, consisting of:
  a flexible substrate comprising a first surface;
  an electrophotographic ink composition printed on the first surface of the flexible substrate, the printed electrophotographic ink composition comprising a polymer resin comprising a copolymer of an alkylene monomer and a monomer selected from acrylic acid and methacrylic acid;

a polymeric base layer;

a thermally activatable laminating layer co-extruded with the polymeric base layer and thermally laminated to the first surface of the flexible substrate printed with the electrophotographic ink composition, the thermally activatable laminating layer comprising a copolymer of an alkylene monomer and a monomer selected from acrylic acid and methacrylic acid; and optionally a sealant layer disposed on a surface of the polymeric base layer other than the surface on which the thermally activatable laminating layer is disposed.

* * * * *